Aug. 25, 1959  T. H. FIKSE  2,901,240
VEHICLE SUSPENSION SYSTEM
Filed Dec. 12, 1955  3 Sheets-Sheet 1
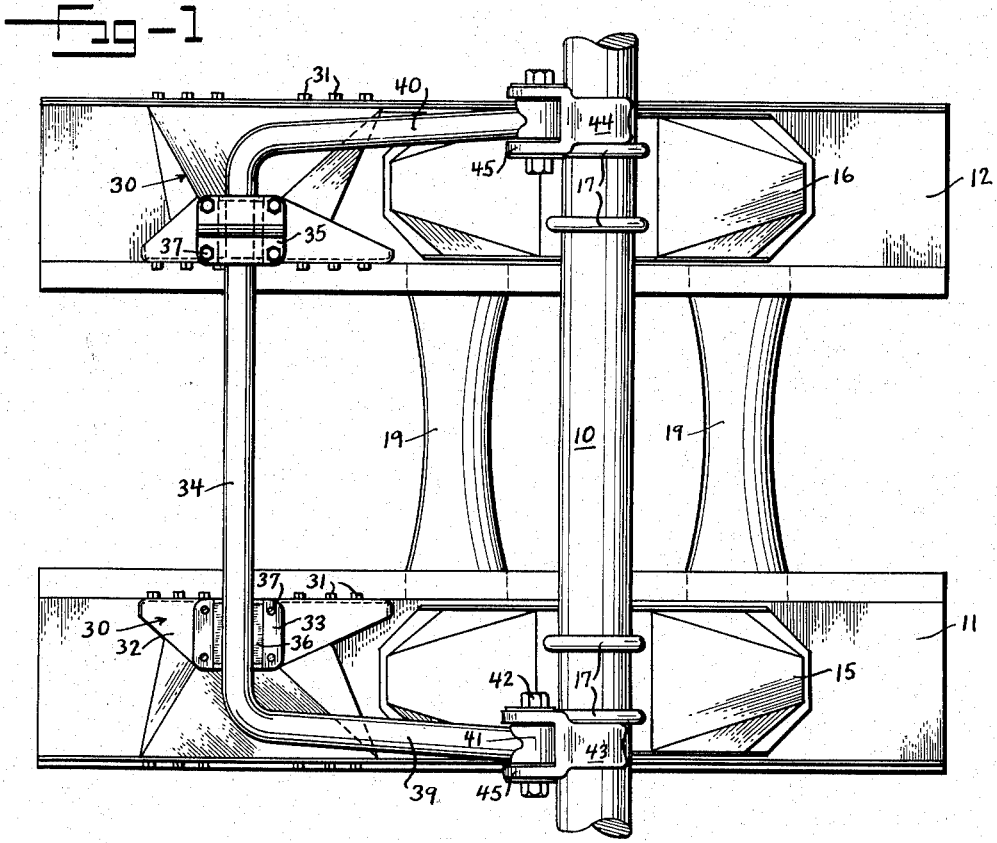
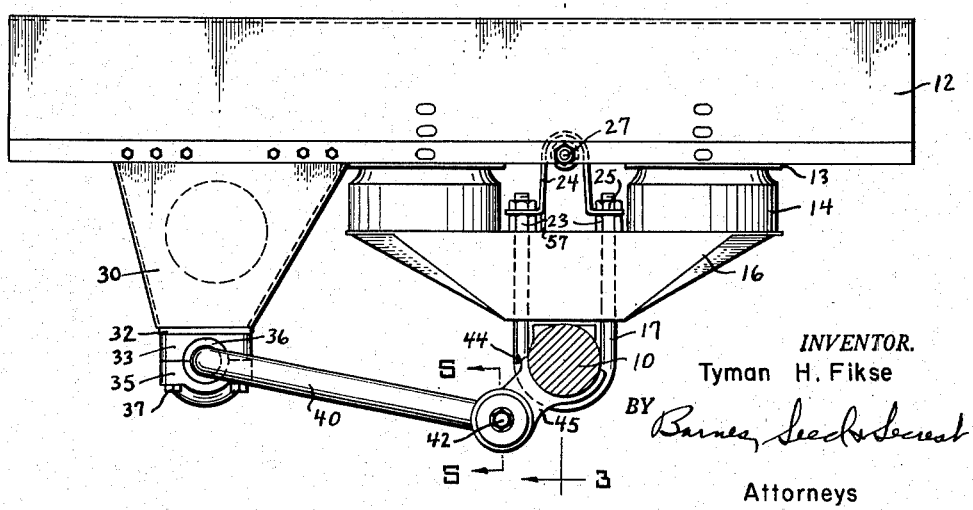
INVENTOR.
Tyman H. Fikse
BY
Attorneys Aug. 25, 1959 T. H. FIKSE 2,901,240
VEHICLE SUSPENSION SYSTEM
Filed Dec. 12, 1955 3 Sheets-Sheet 2
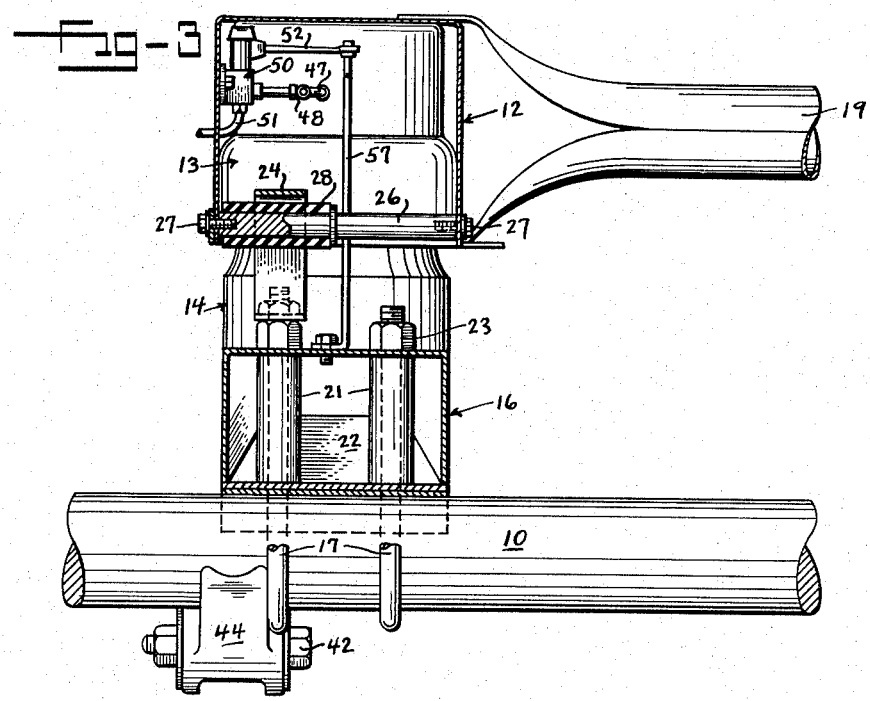
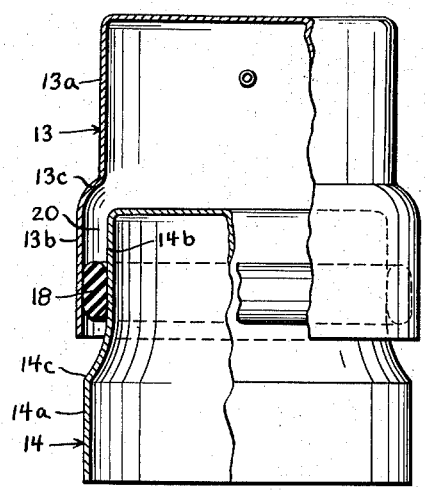
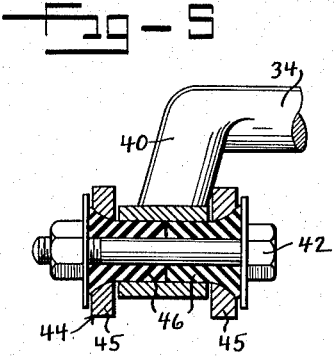
INVENTOR.
Tyman H. Fikse
BY Barnes, Seed, & Senest
Attorneys Aug. 25, 1959 T. H. FIKSE 2,901,240
VEHICLE SUSPENSION SYSTEM
Filed Dec. 12, 1955 3 Sheets-Sheet 3
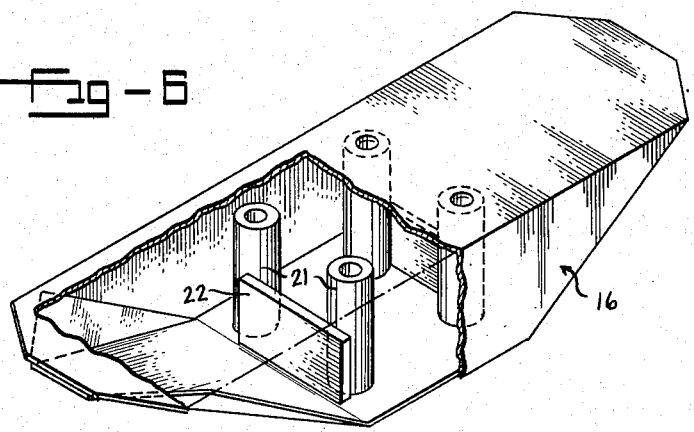
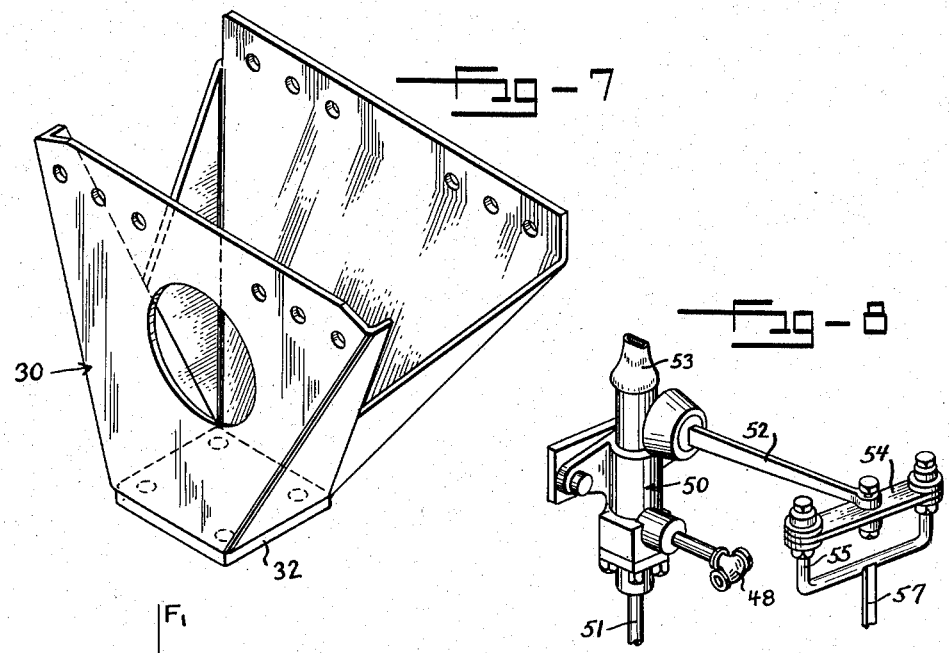
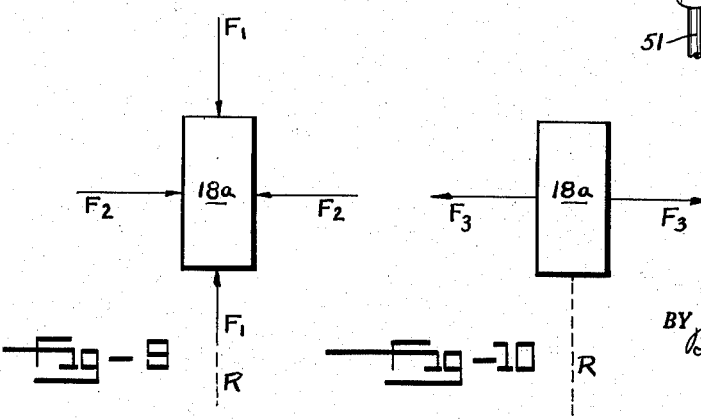
INVENTOR.
Tyman H. Fikse
BY
Attorneys

United States Patent Office 2,901,240
Patented Aug. 25, 1959

2,901,240

VEHICLE SUSPENSION SYSTEM

Tyman H. Fikse, Seattle, Wash.

Application December 12, 1955, Serial No. 552,388

6 Claims. (Cl. 267—11)

The present invention relates to suspension systems for vehicles utilizing air springs of the general type disclosed in my copending application, Ser. No. 517,109, filed May 9, 1955, now abandoned, and namely, air springs having inner and outer telescoping members having an elastic ring compressed therebetween. One of these telescoping members is supported by the vehicle axle assembly while the other is carried by the vehicle frame and is normally supplied with compressed air or some other pressurized fluid for yieldingly urging the members apart.

An important object of my invention is to provide a suspension system utilizing such air springs which will be of light weight and economical construction and at the same time makes provision in a simple manner for the compensation of those forces due to side sway or braking of the vehicle.

With yet additional objects and advantages in view which, with the foregoing, will appear and be understood in the course of the following description and claims, the invention consists in the novel construction and in the adaptation and combination of parts hereinafter described and claimed.

In the accompanying drawings:

Figure 1 is an underside plan view of my suspension system with certain parts broken away.

Fig. 2 is a side elevational view taken from the left side and with the axle in vertical section.

Fig. 3 is a transverse vertical sectional view taken as indicated by line 3—3 of Fig. 2.

Fig. 4 is an enlarged elevational view of one of the spring units with parts broken away.

Fig. 5 is an enlarged fragmentary vertical sectional view taken as indicated by line 5—5 of Fig. 2.

Fig. 6 is an enlarged perspective view, with parts broken away, of one of the axle beams.

Fig. 7 is an enlarged perspective view of one of the bearing brackets.

Fig. 8 is an enlarged perspective view of the control valve assembly.

Figs. 9 and 10 illustrate the compressive and tensile forces, respectively, acting in a segment of the elastic rings.

In the drawings I have illustrated two pairs of my spring units carrying an axle 10 beneath a vehicle subframe having right and left longitudinal frame rails 11, 12 each taking the form of an inverted channel. Pairs of cross-members 19 each having upper and lower complementing halves welded together extend between the frame rails. Each spring unit has an outer can 13 which is welded within the respective channel 11, 12 and is telescopically associated with an inner can 14. This can is in turn mounted on an end of one of a pair of longitudinally extending axle beams 15, 16 beneath which the axle 10 is clamped as by pairs of U-bolts 17. The cans 13, 14 of each spring unit are spaced apart radially speaking and have an elastic ring 18 wedged between their telescoping portions which seals off an annular pressure chamber 20 surrounding part of the length of the inner can 14.

The axle beams 15, 16 taper upwardly and inwardly at their ends. They may be fabricated from sheet stock and be of two-piece hollow construction as best shown in Fig. 6. For receiving the legs of each U-bolt 17 there is provided in the axle beams a respective pair of pipe braces 21 which are cross-braced by a plate 22. The upper ends of the legs of the two out-board U-bolts not only receive hold-down nuts 23 but also receive the apertured feet of a pair of stirrup straps 24 which are held by nuts 25. These straps are of an inverted U-shape and straddle keeper bolt assemblies which traverse the frame channels 11, 12. Each such assembly has a rod 26 which is tapped at both ends to receive cap screws 27 passing through the vertical flanges of the corresponding frame channel, and a rubber sleeve 28 covers that part of the rod which is susceptible to engagement by the stirrup strap. The purpose of these stirrup straps is to limit the distance that the vehicle frame and the ends of the axle can move apart due for example to side sway of the vehicle or to a jacking up of the vehicle frame in order to change a tire.

Depending from the frame channels 11, 12 forwardly of the axle beams is a pair of bearing brackets 30 which are secured to the channels by bolts 31. These brackets may be of welded two-piece construction as best shown in Fig. 7 and each has a base plate 32. Seated against these base plates are the pillow blocks 33 of a pair of bearings for receiving a sway bar 34. The caps for the bearings are numbered 35 and cooperate with the blocks 33 to clamp rubber bushing halves 36 around the sway bar. Bolts 37 apply pressure to these bushings and hold the bearing in place by passing through the bearing caps and blocks and through the bases of the bearing brackets to receive nuts within the latter.

The sway bar 34 is actually a torsion rod and formed integrally with the ends thereof are a pair of right and left lever arms 39, 40 which are fitted with terminal eyes 41 at their free ends. These eyes make a pivoted connection by means of pins 42 with pairs of trunnions 45 provided by axle arm members 43, 44. The latter have weld connections with the axle 10 which are preferably at points outboard of the pairs of U-bolts 17. It will be noted that pin 42 has a two-piece rubber sleeve 46, and to aid in the insertion of this sleeve the eye openings in the trunnions 45 are inwardly tapered.

Directing attention to Fig. 4 it will be seen that each inner can 14 has a cylindrical base portion 14a welded at the bottom to the upper face of the respective beam 15, 16 and a reduced head portion 14b. This head portion is closed at the top and is cylindrical for approximately the upper half of its length after which it gradually increases in diameter until it merges by a rounded annular shoulder 14c with the base portion 14a.

Each outer cam 13 is inverted in that it has a depending cylindrical base portion 13a closed at the top. The inside diameter of this base portion 13a is slightly greater than the outside diameter of the reduced cylindrical part of the inner can's head portion 14b. An annular rounded shoulder portion 13c joins the base portion 13a with an enlarged cylindrical head portion 13b which has an inside diameter slightly larger than the outside diameter of the base portion 14a of the inner can. This shoulder 13c is desirably concave with respect to the inside of the outer can.

The elastic ring 18 has a cross-sectional diameter when relaxed which may be approximately twice the clearance between the head portion 13b of the outer can and the cylindrical top part of the head portion 14b of the inner can. As a result the ring is considerably radially compressed between the cans 13, 14 and this radial compression causes compression of the ring tangentially thereof. To offset this tangential compression I pretension the ring by stretching it over the inner can. In other words, the relaxed inside diameter of the ring is less than the smallest outside diameter of the inner can a sufficient amount that the ring in order to be stretched over the inner can, must be tensioned to a value at least as great as the maximum tangential compression caused by radial compression of the ring. These compressive and tensile forces have been illustrated in Figs. 9 and 10 in which a ring segment is denoted 18a and the broken line R is a radius of the ring. The arrows F represent the radial compressive forces caused by a compression of the ring between the inner and outer cans, and the arrows $F_2$ denote the tangential compressive forces resulting from such forces $F_1$. These latter forces, if not counteracted, could cause a warping of the ring out of a transverse plane. Arrows $F_3$ represent the tangential tensile forces resulting from the stretching of the ring over the inner can and it is preferable that these tensile forces exceed the tangential compressive forces $F_2$.

The outer cans 13 at each side of the frame, and hence the annular pressure chambers 20 sealed off by the ring 18, are supplied with compressed air or some other pressurized fluid through a pair of tubes 47 leading to respective openings near the top of the cans. These tubes 47 merge at a Y-fitting 48 which is connected to a two-way slide control valve 50 mounted on the inside of the corresponding frame rail 11, 12. Directing attention to Fig. 7, the bore of this valve 50 is connected at its lower end with a supply line 51 leading, for example, from the vehicle's air brake system. The valve has a control arm 52 for positioning the slide valve between two positions, a fill position causing the tubes 47 to the outer cans 13 to receive fluid from the supply line 51, and a dump position blocking off the supply line and causing the tubes 47 to vent through a discharge fitting 53 to the atmosphere. At its outer end the control arm 52 has a bolt connection with a fiber piece 54 bridging the forks 55 at the head of an upright forked rod 57 which is rigidly connected at its lower end to the respective axle beam 15, 16. When the control arm 25 is caused to pivot upwardly from a substantially horizontal neutral position in response to downward movement of the vehicle frame relative to the axle 10, the valve reaches its fill position causing the pressure in the pressure chambers 20 to be increased. Conversely, when the control arm 52 pivots downwardly responsive to upward movement of the vehicle frame relative to the axle the valve assumes its dump position causing a lowering of pressure in the pressure chambers. In this manner the spacing of the axle below the vehicle frame when the vehicle is at rest can be maintained at a predetermined constant value independent of the static load on the vehicle.

The action of the elastic ring 18 in each spring unit will now be explained in detail. As shown in Fig. 5, the ring is normally seated between the lower beveled part of the inner can's head portion 14b and the head portion 13b of the related outer can and the load of the vehicle frame on the outer can of course causes a deformation of the ring as it is squeezed between the two cans. When the vehicle wheels strike a raised irregularity in the roadbed the effect is for the inner and outer cans of each spring unit to attempt to telescope further together due to the resulting shock load. Such movement is yieldingly resisted by the compressed air in the pressure chamber 20 and by the ring 18. If the load is severe enough the annular shoulder 13c, 14c may have to engage the ring top and bottom and vertically compress the ring therebetween as shown by the broken line positions in Fig. 4 in order to absorb the load.

It is of utmost importance to understand that as the cans telescope further together, or on the other hand, further apart, the ring 18 does not slide, but turns about its centroidal axis. By the term centroidal axis is meant the circle which is the locus of the centroids of all radial cross-sectional increments of the ring that can be taken at any particular instant of time. It will therefore be apparent that the centroidal axis varies along with the amount of deformation of the ring. To elaborate in the turning of the ring, in the instance wherein the inner and outer cans are telescoping further together, the portions of the ring above the plane of its centroidal axis will turn toward the center of the ring whereas those portions below such plane will turn away from the center of the ring. Likewise, when the inner and outer cans move further apart to assume their neutral position or because of a depression in the roadbed, the ring will turn about its centroidal axis in the opposite manner, that is, the portions of the ring above the plane of its centroidal axis will turn away from the center of the ring and those portions below such plane will turn toward the center of the ring. It thus becomes apparent that the elastic ring 18 by so turning about its centroidal axis, helps to absorb part of the load, and in fact, the ring 18 can assume the entire load by the shoulder 14c bottoming on the ring if, for example, the supply of compressed air is cut off.

Also of significant importance, is the fact that the ring 18 can absorb loads which tend to move the vehicle frame laterally with respect to the axle 10. Imagine that the vehicle shown fragmentarily in the drawings were making a right turn around a steeply banker curve. This would cause the vehicle frame to lean and sway to the right with respect to the wheels and axle, and hence the outer cans 13 would be forced to the right with respect to the inner cans 14. Yieldingly resisting this force would be the right-hand half of each ring 16. These right-hand halves would of course be compressed by this lateral load but the seal of the pressure chamber would not be broken since the left-hand halves of the rings would responsively expand to fill the increased gap between the inner and outer cans occurring on the left-hand side thereof. During this right turn the outer cans 13 at the left side of the vehicle also would move upwardly with respect to the inner cans 14 and the amount of such upward vertical movement is limited by the left stirrup strap 24 acting on the elastic sleeve 28 of the respective keeper bolt assembly.

The torsion rod 34 also comes into play during sidewise sway of the vehicle tending to tilt the vehicle frame with respect to the axle. Continuing the right turn example wherein the right end of the axle tends to tilt upwardly and the left end to tilt downwardly with respect to the vehicle frame, the result is for the right lever arm 39 to attempt to twist the torsion rod in the counter-clockwise direction as viewed in Fig. 2 and for the left lever arm 40 to resist by exerting a twisting force on the torsion rod in the clockwise direction. Hence, the torsion rod will exert a vehicle leveling influence in the sense that the vehicle frame will be yieldingly urged to remain in parallel relation to the axle. In order for the lever arms 39, 40 to pivot up and down the respective ends of the axle must shift slightly fore and aft with respect to the vehicle frame, say, up to about ⅜ of an inch in a typical installation, since the pins 42 move in an arc. Accordingly, the inner cans 14 on the corresponding side of the vehicle will tilt slightly with respect to their outer cans 13 about their respective elastic rings 18 causing the radial compression in the front and back halves of the latter to fluctuate somewhat.

The lever arms 39, 40 also come into play when the wheels of the vehicle are braked. As this occurs the axle tends to turn counter-clockwise as viewed in Fig. 2 and such movement is resisted by the lever arms and by the front halves of the elastic rings 18. In this regard, pivots 42 are made as close to the ground surface as road conditions permit so that the forces on the lever arms and elastic rings required to resist the braking torque will be as small as possible. Thus it is seen that the lever arms and the elastic rings provide force couples resisting braking torque. These force couples also resist the drive torque resulting from a powering of the vehicle.

The advantages of the invention, it is thought, will have been clearly understood from the foregoing detailed description. Minor changes will suggest themselves and may be resorted to without departing from the spirit of the invention, wherefore it is my intention that no limitations be implied and that the hereto annexed claims be given a scope fully commensurate with the broadest interpretation to which the employed language admits.

What I claim is:

1. In a spring system, a frame assembly and an axle assembly movable with respect to one another, said axle assembly having a wheel turning axis extending laterally beneath the frame assembly, a pair of spring units spaced apart cross-wise of the frame assembly and each having inner and outer members telescopically associated with one another, said inner members being mounted on one of said assemblies and said outer members being mounted on the other of said assemblies, a respective elastic ring radially compressed between the inner and outer members of each spring unit, torsion rod means extending cross-wise of the frame assembly and journal mounted on one of said assemblies, and lever means operatively associated with said torsion rod means and operatively associated with the other of said assemblies at pivot points displaced vertically with respect to the level of said elastic rings and said wheel turning axis, the level of said pivot points and the level of said rings being at opposite sides, vertically speaking, of said wheel turning axis whereby lateral tilting of the axle assembly with respect to the frame assembly about a longitudinal axis between said spring units causes a torsional windup of said torsion rod means for yieldingly resisting such tilting and whereby said lever means and said elastic rings provide force couples for resisting braking and drive torques.

2. In a spring system, a frame assembly and an axle assembly movable with respect to one another, said axle assembly having a wheel turning axis extending laterally beneath the frame assembly, a pair of spring units spaced apart cross-wise of the frame assembly and each having inner and outer members telescopically associated with one another, said inner members being mounted on one of said assemblies and said outer members being mounted on the other of said assemblies, a respective solid elastic ring radially compressed between the inner and outer members of each spring unit, a torsion rod extending cross-wise of the frame assembly in parallel relation to the axle assembly, said torsion rod being journal mounted in elastic bearings mounted on one of said assemblies and having a pair of lever arms which are rigidly connected to its ends and are pivotally connected to the other of said assemblies at pivot points displaced vertically with respect to the level of said elastic rings and said wheel turning axis, the level of said pivot points and the level of said rings being at opposite sides, vertically speaking, of said wheel turning axis whereby lateral tilting of the axle assembly with respect to the frame assembly about a longitudinal axis between said spring units will be yieldingly resisted by a resulting torsional windup of said torsion rod and whereby said lever arms and said elastic rings provide force couples for resisting braking and drive torques.

3. In a spring system, an axle assembly having a wheel turning axis, a frame assembly having a pair of laterally spaced longitudinal frame members of an inverted channel-like configuration and movable with respect to said axle assembly, a pair of spring units comprising a pair of inner members and a pair of outer members telescopically associated with one another and a pair of solid elastic rings each radially compressed between the inner and outer members of a respective said spring unit, one pair of said members being mounted within said longitudinal frame members and the other pair of said members being mounted on the axle assembly, torsion rod means extending cross-wise of the frame assembly and journal mounted on one of said assemblies, and lever means operatively associated with said torsion rod means and pivotally connected to the other of said assemblies at points displaced level of said wheel turning axis, whereby lateral tilting of the axle assembly with respect to the frame assembly about a longitudinal axis between said spring units causes a torsional windup of said torsion rod means for yieldingly resisting such tilting and whereby said lever means and said elastic rings provide force couples for resisting braking and drive torques.

4. In a spring system, an axle having a wheel turning axis, a pair of longitudinally extending beams surmounting the axle, U-bolt means holding the beams rigid with respect to the axle, a frame assembly presenting a pair of longitudinal frame members of inverted channel-like configuration located above the beams, a pair of spring units for each beam and comprising a pair of inner members and a pair of outer members telescopically associated with one another and a pair of solid elastic rings each radially compressed between the inner and outer members of a respective said spring unit, one pair of said members being mounted within the overlying one of said longitudinal frame members and the other pair of said members being mounted on opposite ends of the respective said beam, a torsion rod extending cross-wise of the frame assembly and journal mounted therein, said rod having a pair of lever arms rigidly connected to its ends and pivotally connected to said axle at points displaced below the level of said wheel turning axis whereby lateral tilting of the axle with respect to the frame assembly about an axis between said beams will be yieldingly resisted by a resulting torsional windup of said torsion rod and whereby said lever arms and elastic rings provide force couples for resisting braking and drive torques.

5. The structure of claim 4 in which said lever arms are pivotally connected to said axle at points spaced outboard of said U-bolt means.

6. In a spring system, a frame assembly and an axle assembly movable with respect to one another, said axle assembly having a wheel turning axis extending laterally beneath the frame assembly, a pair of spring units comprising a pair of inner members and a pair of outer members telescopically associated with one another and a pair of solid elastic rings each radially compressed between the inner and outer members of a respective said spring unit, said inner and outer members being rigidly mounted, respectively, on said axle and frame assemblies, torsion rod means extending cross-wise of the frame assembly and journal mounted thereon, a pair of lever means rigidly connected to said torsion rod means and pivotally connected to said axle assembly at points displaced below the level of said wheel turning axis whereby lateral tilting of the axle assembly with respect to the frame assembly causes a torsional windup of said torsion rod means for yieldingly resisting such tilting and whereby said pair of lever means and said elastic rings provide force couples for resisting braking and drive torques.

References Cited in the file of this patent

UNITED STATES PATENTS

| 2,010,623 | Bugatti | Aug. 6, 1935 |
| 2,208,538 | Brown | July 16, 1940 |
| 2,691,420 | Fox et al. | Oct. 12, 1954 |
| 2,790,634 | Fawick | Apr. 30, 1957 |

FOREIGN PATENTS

| 1,096,913 | France | Feb. 9, 1955 |